United States Patent
Hashimoto et al.

(10) Patent No.: US 10,355,635 B2
(45) Date of Patent: Jul. 16, 2019

(54) MOTOR CONTROL DEVICE

(71) Applicant: Panasonic Intellectual Property Management Co., Ltd., Osaka (JP)

(72) Inventors: Atsumi Hashimoto, Osaka (JP); Hiroyuki Nakata, Osaka (JP); Yasuyoshi Honuchi, Osaka (JP); Ryosuke Yamamoto, Osaka (JP)

(73) Assignee: Panasonic Intellectual Property, Osaka (JP)

( * ) Notice: Subject to any disclaimer, the term of this patent is extended or adjusted under 35 U.S.C. 154(b) by 0 days.

(21) Appl. No.: 15/574,004

(22) PCT Filed: Jun. 29, 2016

(86) PCT No.: PCT/JP2016/003114
§ 371 (c)(1),
(2) Date: Nov. 14, 2017

(87) PCT Pub. No.: WO2017/022170
PCT Pub. Date: Feb. 9, 2017

(65) Prior Publication Data
US 2018/0275627 A1    Sep. 27, 2018

(30) Foreign Application Priority Data
Aug. 5, 2015 (JP) ................. 2015-154930

(51) Int. Cl.
*H02P 29/50*     (2016.01)
*H02P 29/00*     (2016.01)
*G05B 19/21*     (2006.01)

(52) U.S. Cl.
CPC .......... *H02P 29/50* (2016.02); *G05B 19/21* (2013.01); *H02P 29/00* (2013.01)

(58) Field of Classification Search
CPC ................. G05B 19/21; H02P 29/00
(Continued)

(56) References Cited

U.S. PATENT DOCUMENTS 5,796,842 A * 8/1998 Hanna ............... G10L 19/008
                                                   348/481
6,084,374 A * 7/2000 Nakatsuka ......... B25J 9/1638
                                                   318/568.1
(Continued)

FOREIGN PATENT DOCUMENTS

EP    1521133 A1    4/2005
JP    1-241912      9/1989
(Continued)

OTHER PUBLICATIONS

The Extended European Search Report dated Jun. 11, 2018 for the related European Patent Application No. 16832461.4.
(Continued)

*Primary Examiner* — Jorge L Carrasquillo
*Assistant Examiner* — Devon A Joseph
(74) *Attorney, Agent, or Firm* — Wenderoth, Lind & Ponack, L.L.P.

(57) ABSTRACT

A motor control device includes a movement command generator that outputs a movement command of a motor, a filter that performs filter processing of the movement command and outputs the filtered movement command, and a position controller that performs a position control of the motor. The filter is an infinite impulse response digital filter that is represented by a transfer function $H(z)$: $H(z)=(b0+b1 \cdot z^{-1}+b2 \cdot z^{-2})/\{1-(a1 \cdot z^{-1}+a2 \cdot z^{-2})\}$ with filter coefficients a1, a2, b0, b1, and b2. The filter is configured to change the filter coefficient b0 in a first sample period, to change the filter coefficients a1 and b1 in a second sample period which follows the first sample period, and to change the filter coefficients a2 and b2 in a third sample period which follows the second sample period.

1 Claim, 5 Drawing Sheets

(58) Field of Classification Search
USPC .......................................................... 318/567
See application file for complete search history.

(56) References Cited

U.S. PATENT DOCUMENTS

| | | | | | |
|---|---|---|---|---|---|
| 6,112,218 | A | * | 8/2000 | Gandhi | H03H 17/0461 708/320 |
| 7,953,505 | B2 | | 5/2011 | Suzuki et al. | |
| 2001/0040927 | A1 | * | 11/2001 | Chu | H03M 3/042 375/254 |
| 2003/0112904 | A1 | * | 6/2003 | Fuller | H04B 1/7093 375/350 |
| 2003/0156602 | A1 | * | 8/2003 | Sage | H04B 3/542 370/480 |
| 2004/0165653 | A1 | * | 8/2004 | Jayaraman | H04B 7/022 375/148 |
| 2007/0016316 | A1 | * | 1/2007 | Hanna | G10L 19/008 700/94 |
| 2008/0097634 | A1 | * | 4/2008 | Suzuki | H03H 17/0294 700/94 |
| 2011/0069749 | A1 | * | 3/2011 | Forrester | H04L 25/03038 375/232 |
| 2013/0083424 | A1 | * | 4/2013 | Iwashiro | G11B 5/59622 360/75 |
| 2013/0211827 | A1 | * | 8/2013 | Savell | G11B 20/10046 704/207 |

FOREIGN PATENT DOCUMENTS

| | | |
|---|---|---|
| JP | 2-250418 | 10/1990 |
| JP | 2-252307 | 10/1990 |
| JP | 11-102215 | 4/1999 |
| JP | 2008-099182 | 4/2008 |

OTHER PUBLICATIONS

Shynk J J: "Adaptive IIR filtering", IEEE ASSP Magazine, IEEE, US, vol. 6, No. 2, Apr. 1, 1989 (Apr. 1, 1989), pp. 4-21, XP011437202.
International Search Report of PCT application No. PCT/JP2016/003114 dated Sep. 13, 2016.

* cited by examiner

FIG. 4

| Period i | Input Data x(i) | Filter Coefficient a1(i) | a2(i) | b0(i) | b1(i) | b2(i) | Intermediate Variable u0(i) | u1(i) | u2(i) | Output data y(i) | Value of Intermediate Variable q(j) (j=1,...,m) |
|---|---|---|---|---|---|---|---|---|---|---|---|
| 1 | p1 | A11 | A21 | B01 | B11 | B21 | q(1) | 0 | 0 | y(1)=B01·q(1)+B11·0+B21·0 | q(1)=A11·0+A21·0+p1 |
| 2 | p2 | A11 | A21 | B02 | B11 | B21 | q(2) | q(1) | 0 | y(2)=B02·q(2)+B11·q(1)+B21·0 | q(2)=A11·q(1)+A21·0+p2 |
| 3 | p3 | A12 | A21 | B03 | B12 | B21 | q(3) | q(2) | q(1) | y(3)=B03·q(3)+B12·q(2)+B21·q(1) | q(3)=A12·q(2)+A21·q(1)+p3 |
| 4 | p4 | A13 | A22 | B04 | B13 | B22 | q(4) | q(3) | q(2) | y(4)=B04·q(4)+B13·q(3)+B22·q(2) | q(4)=A13·q(3)+A22·q(2)+p4 |
| 5 | p5 | A14 | A23 | B05 | B14 | B23 | q(5) | q(4) | q(3) | y(5)=B05·q(5)+B14·q(4)+B23·q(3) | q(5)=A14·q(4)+A23·q(3)+p5 |
| 6 | 0 | A15 | A24 | B05 | B15 | B24 | q(6) | q(5) | q(4) | y(6)=B05·q(6)+B15·q(5)+B24·q(4) | q(6)=A15·q(5)+A24·q(4) |
| 7 | 0 | A15 | A25 | B05 | B15 | B25 | q(7) | q(6) | q(5) | y(7)=B05·q(7)+B15·q(6)+B25·q(5) | q(7)=A15·q(6)+A25·q(5) |
| 8 | 0 | A15 | A25 | B05 | B15 | B25 | q(8) | q(7) | q(6) | y(8)=B05·q(8)+B15·q(7)+B25·q(6) | q(8)=A15·q(7)+A25·q(6) |
| ... | | | | | | | ... | ... | ... | ... | ... |
| m-2 | 0 | A15 | A25 | B05 | B15 | B25 | q(m-2) | q(m-3) | q(m-4) | y(m-2)=B05·q(m-2)+B15·q(m-3)+B25·q(m-4) | q(m-2)=A15·q(m-3)+A25·q(m-4) |
| m-1 | 0 | A15 | A25 | B05 | B15 | B25 | q(m-1) | q(m-2) | q(m-3) | y(m-1)=B05·q(m-1)+B15·q(m-2)+B25·q(m-3) | q(m-1)=A15·q(m-2)+A25·q(m-3) |
| m | 0 | A15 | A25 | B05 | B15 | B25 | q(m) | q(m-1) | q(m-2) | y(m)=B05·q(m)+B15·q(m-1)+B25·q(m-2) | q(m)=A15·q(m-1)+A25·q(m-2) |

MOTOR CONTROL DEVICE

This application is a U.S. national stage application of the PCT international application No. PCT/JP2016/003114 filed on Jun. 29, 2016, which claims the benefit of foreign priority of Japanese patent application No. 2015-154930 filed on Aug. 5, 2015, the contents all of which are incorporated herein by reference.

TECHNICAL FIELD

The present invention relates to a motor control device that controls an angular position of a motor by performing filter processing of a movement command.

BACKGROUND ART

FIG. 5 is a schematic diagram of motor control device 501 that performs a position control of motor 7. Motor control device 501 includes movement command generator 1 that generates a movement command for driving and rotating motor 7, position controller 2 that controls an angular position of rotation of motor 7, speed controller 3 that controls a rotation speed of motor 7, current controller 4 that controls a current supplied to motor 7, amplifier 5 that supplies the current to motor 7, position detector 8 that detects the angular position of the rotation of motor 7, processor 10 that performs processing of a signal from position detector 8, and power supply 9 that supplies power to amplifier 5. Processor 10 processes the signal from position detector 8 of motor 7, and converts the result into actual speed co of motor 7 and actual movement amount $\Delta\theta$ of motor 7.

Movement command generator 1 generates movement command $\Delta\theta^*$ based on an operation program produced by a user, and outputs the generated movement command for each predetermined period. Movement command $\Delta\theta^*$ is a rotation amount of the motor per unit time.

Position controller 2 obtains position command $D\theta$ by integrating movement commands $\Delta\theta^*$ output from movement command generator 1 for each of predetermined periods, and subtracts actual movement amount $\Delta\theta$ for each of the predetermined periods from position command $D\theta$. Actual movement amount $\Delta\theta$ is a rotation angle amount of motor 7 for each predetermined time and is obtained by processing output of position detector 8 by processor 10.

Position controller 2 holds a position deviation amount which is a difference between the sum of movement commands $\Delta\theta^*$ from movement command generator 1 and the sum of actual movement amounts $\Delta\theta$ from processor 10. Position controller 2 outputs speed command $\omega^*$ which is the product obtained by multiplying the position deviation amount by a proportional constant (position gain). A value obtained by multiplying movement command $\Delta\theta^*$ by a proportional constant (feedforward gain) may be added to the speed command.

Speed controller 3 performs, for example, a PI control on a difference between speed command $\omega^*$ output from position controller 2 and actual speed $\omega$ of the motor output from processor 10, and outputs current command $I^*$.

Current controller 4 performs, for example, a PI control on a difference between current command $I^*$ output from speed controller 3 and actual current $I$ supplied to motor 7, and outputs a voltage command or a PWM command.

Actual current $I$ is detected by current detector 6.

Amplifier 5 generates a current to be supplied to motor 7 from power supply 9 based on the voltage command or the PWM command from current controller 4.

Power supply 9 connected to amplifier 5 supplies electric power to amplifier 5, and serves as a current supply source of motor 7.

An industrial machine, such as a robot, is configured by using motor control device 501.

For example, a robot includes motors. The number of the motors is determined according to the number of joints of arms to be driven. Each motor is connected to the robot arm via a speed reduction gear.

The robot with the above configuration constitutes a dual inertial system in which the speed reduction gear and the arm are made of elastic material and the motor and a load (arm or the like) move via a rigid shaft (speed reduction gear or the like). In the dual inertial system, a vibration may occur during driving. In particular, the vibration is likely to occur when a movement starts from a stationary state and when the movement is stopped at a target position.

In general, movement command generator 1 of motor control device 501 performs so-called acceleration/deceleration processing such that movement command $\Delta\theta^*$ gradually increases and thus reaches a target movement command amount after an elapse of a certain time, and that movement command $\Delta\theta^*$ gradually decreases and thus becomes 0 at the target position as the arm of the robot (hereinafter, referred to as a robot arm) approaches the target position. Thereby, occurrence of the vibration is suppressed.

However, in spite of the acceleration/deceleration processing, a vibration may still occur.

In such a case, a filter is inserted between movement command generator 1 and position controller 2. The filter removes an excitation component included in the movement command.

The excitation component is a vibration component including a natural vibration of the dual inertial system. A cutoff frequency of the filter is set to a natural vibration frequency in the dual inertial system.

On the other hand, when a posture of the robot arm changes, the natural vibration frequency changes. This is because, viewing from the motor, the amount of the inertia of the robot arm and an object mounted on an end of the robot arm changes according to the posture of the robot.

Therefore, in a case of removing the excitation component by the filter, the cutoff frequency of the filter is changed according to the posture of the robot arm.

For this reason, a method for changing a filter coefficient of filter processing of a movement command according to the posture of the robot arm is proposed (PTL 1).

In general, when the filter coefficient is changed while data remains in the filter, the sum of inputs into the filter is not equal to the sum of outputs from the filter.

In the filter processing of the movement command, a problem may occur due to such a situation. This is because a target position after the filter processing (integrated value of the movement command after the filter processing) is different from an original target position (integrated value of the movement command before the filter processing).

Thus, as described below, a filter disclosed in PTL 1 is configured such that the target position is not different from the original target position even while the filter coefficient is changed from a movement start position to a target position.

In other words, n-number of filters are disposed in parallel, movement commands input for each control period are sequentially input to different filters, and the sum of outputs of the filters is used as a movement command which is input to the position controller.

This filter is a digital filter, an n-order finite impulse response (FIR) filter. In the n-order FIR filter (hereinafter, referred to as a filter), after one piece of data is input, when the next data is not input, the filter becomes empty after n-number of periods. In addition, after n-number of periods, when the filter becomes empty, the sum of inputs into the filter is equal to the sum of outputs from the filter.

In the filter, one movement command is processed by one filter, and then until the movement command is completely removed from the filter, the next movement command is not input into the filter. The next movement command is input into another filter connected in parallel.

Only when the filter becomes empty, the filter can receive a new movement command. For example, for N-number of movement commands, the first movement command is input into the first filter. Then, the second movement command is input into the second filter. The filler coefficient of the second filter may be different from the filter coefficient of the first filter.

In this manner, the k-th movement command (k≤n≤N) is input into the k-th filter, and such processes are sequentially performed in order. The filter coefficients are different a little from each other.

In this manner, when the n-th movement command is input into the n-th filter, since the first filter is empty, the (n+1)-th movement command is input into the first filter. The filter coefficient of the first filter at this moment can be set to a value different from the filter coefficient when the first movement command at the previous time is input.

This is repeated in order, and thus the filter constant is gradually changed.

In each filter, since the filter coefficient is not changed while the filter holds data (movement command), the sum of inputs is equal to the sum of outputs.

The configuration can change the cutoff frequency of the filter while moving, without occurrence of a difference between the sum of inputs of the movement command and the sum of outputs of the movement command.

CITATION LIST

Patent Literature

PTL 1: Japanese Patent Laid-Open Publication No. 11-102215

SUMMARY

A motor control device includes a movement command generator that outputs a movement command of a motor, a filter that performs filter processing of the movement command and outputs the filtered movement command, and a position controller that performs a position control of the motor. The filter is an infinite impulse response digital filter that is represented by a transfer function $H(z)$: $H(z)=(b0+b1\cdot z^{-1}+b2\cdot z^{-2})/\{1-(a1\cdot z^{-1}+a2\cdot z^{-2})\}$ with filter coefficients a1, a2, b0, b1, and b2. The filter is configured to change the filter coefficient b0 in a first sample period, to change the filter coefficients a1 and b1 in a second sample period which follows the first sample period, and to change the filter coefficients a2 and b2 in a third sample period which follows the second sample period.

The filter of the motor control device changes a cutoff frequency with a small computation amount, and prevents occurrence of a difference between the sum of input data and the sum of output data.

BRIEF DESCRIPTION OF DRAWINGS

FIG. 4 illustrates an operation of the motor control device according to the embodiment.

DETAIL DESCRIPTION OF EXEMPLARY EMBODIMENT

Figure 1:
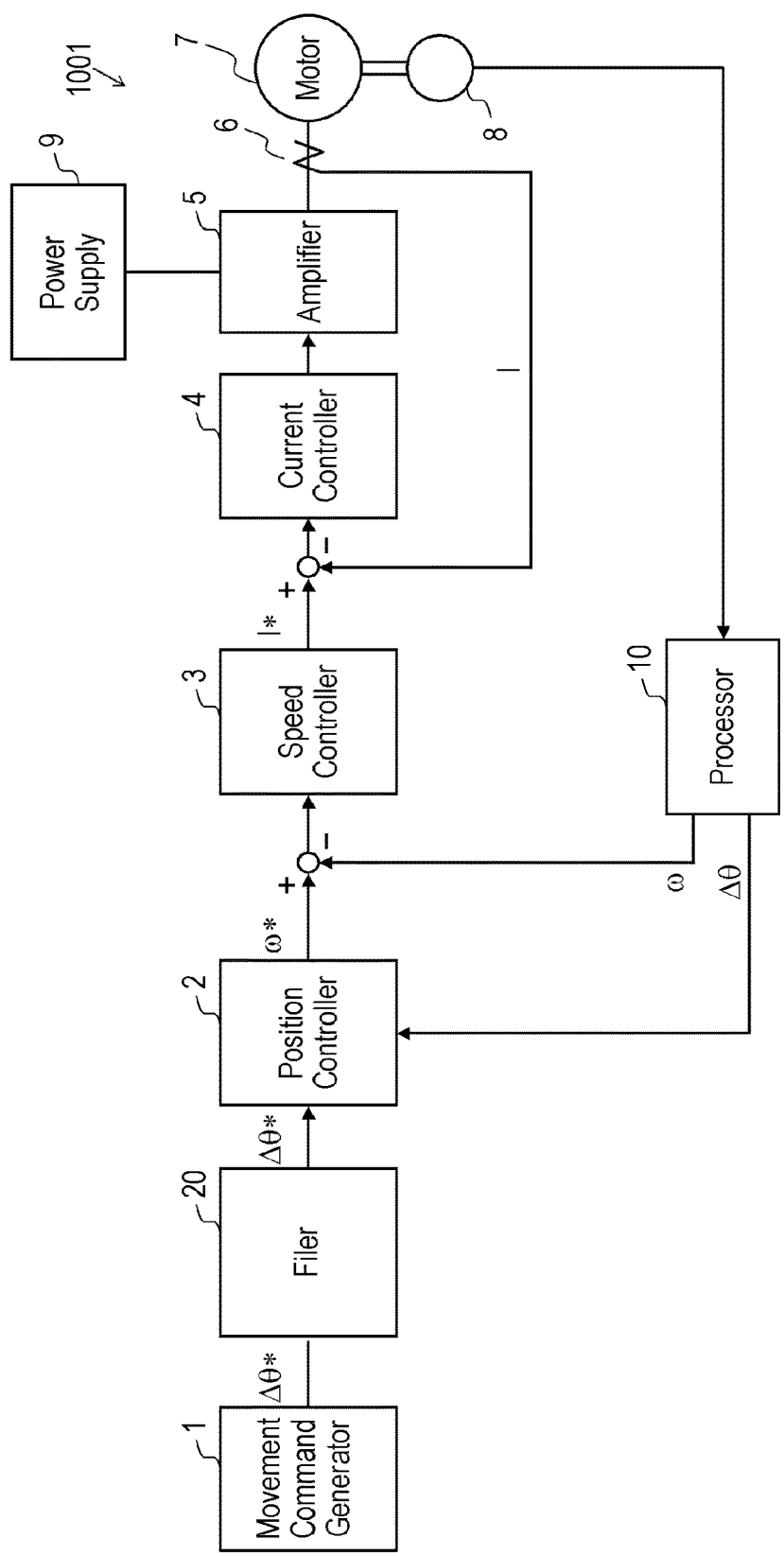
FIG. 1 is a schematic diagram of a motor control device according to an exemplary embodiment.
Figure 5:
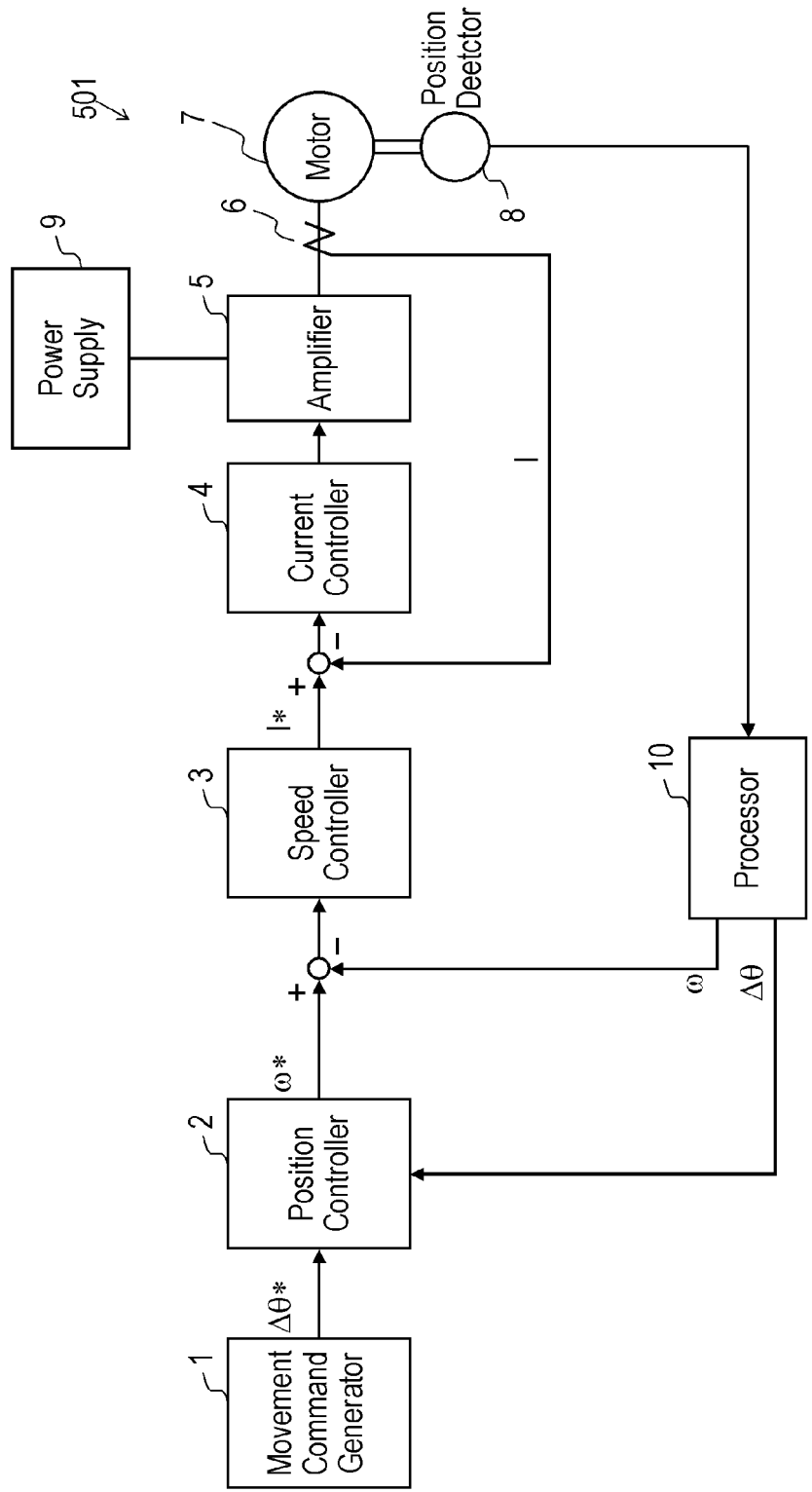
FIG. 5 is a schematic diagram of a conventional motor control device.

FIG. 1 is a schematic diagram of motor control device 1001 according to an exemplary embodiment. In FIG. 1, components identical to those of motor control device 501 illustrated in FIG. 5 are denoted by the same reference numerals, and their description will not be detailed.

In the case that a robot arm has a high natural vibration frequency, an order of the filter is low, and thus, the method disclosed in PTL 1 is effective.

On the other hand, in the case that the natural vibration frequency of the robot arm is low, a calculation amount increases, and as a result, it is difficult to cope with the situation. This is because, as in a case corresponding to a low natural vibration frequency, in order to lower a cutoff frequency of an FIR filter, the order of the filter needs to be a high order (it is necessary to increase a filter coefficient). Further, in the configuration disclosed in PTL 1, it is necessary to connect filters in parallel by numbers proportional to the order of the filter. That is, a computation amount increases in proportion to the square of the order of the filter.

On the other hand, from a viewpoint of cost reduction and easy data synchronization among multi axis of motor shafts of the robot arm, there is a demand for controlling multi axis shafts by one CPU. Under the present condition, there is no margin in a computation capacity of the CPU. Further, it is also required to shorten a control cycle in order to improve control performance. On the contrary, in fact, the computation amount of the filter is required to be reduced.

In the case where the robot arm has a large size, although the natural vibration frequency of the robot arm is lowered, due to the reasons as described above, it is difficult to cope with the method disclosed in PTL 1.

Thus, as a solution to this problem, a method of using an infinite impulse response (IIR) filter is considered.

The IIR filter has an advantage in that the cutoff frequency can be set to any frequency by using a small number of coefficients.

On the other hand, even the IIR filter has the same property as that of the FIR filter, in that the sum of inputs into the filter is not equal to the sum of outputs from the filter when the filter coefficient is changed while data remains in the filter.

Therefore, from the configuration of PTL 1, a configuration in which plural IIR filters are connected in parallel to each other and data is sequentially input into each of the IIR filters one by one, is considered.

On the other hand, since data remains in the IIR filter for a long period of time, it is necessary to connect a large number of IIR filters. Eventually, even when the computation amount of each filter is small, the number of filters connected in parallel increases, and as a result, the computation amount is not reduced.

Motor control device 1001 according to the embodiment illustrated in FIG. 1 will be described below. Unlike motor control device 501 illustrated in FIG. 5, motor control device 1001 further includes filter 20 provided between movement command generator 1 and position controller 2.

Figure 2:
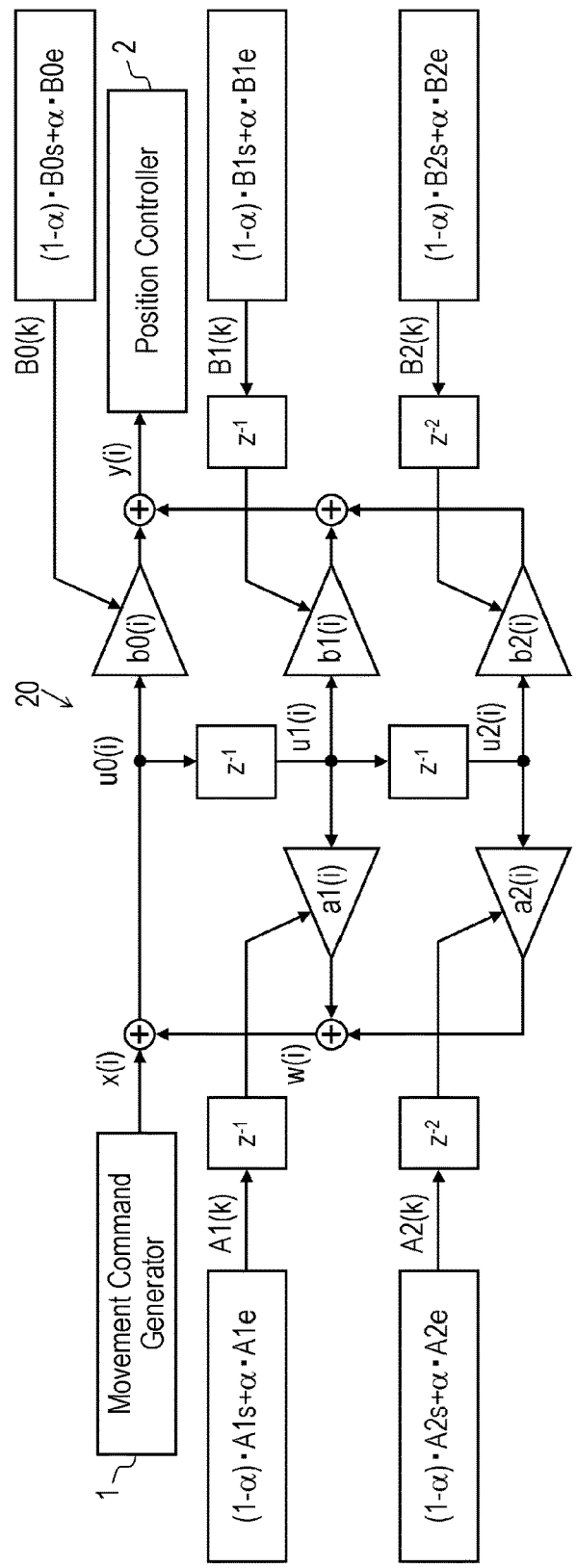
FIG. 2 is a schematic diagram of a filter of the motor control device according to the embodiment.

FIG. 2 is a diagram of filter 20.

Filter 20 according to the embodiment is a second-order infinite impulse response (IIR) filter. Transfer function H(z) of the filter 20, which is a second-order digital IIR filter, is represented by Formula 1.

$$H(z)=(b0+b1 \cdot z^{-1}+b2 \cdot z^{-2})/\{1-(a1 \cdot z^{-1}+a2 \cdot z^{-2})\} \quad \text{[Formula 1]}$$

Filter coefficients a1, a2, b0, b1, and b2 of Formula 1 satisfy the relationship of Formula 2.

$$a1+a2+b0+b1+b2=1 \quad \text{[Formula 2]}$$

By appropriately designing filter coefficients a1, a2, b0, b1, and b2, a cutoff frequency and an attenuation amount of filter 20 can be arbitrarily determined.

Figure 3:
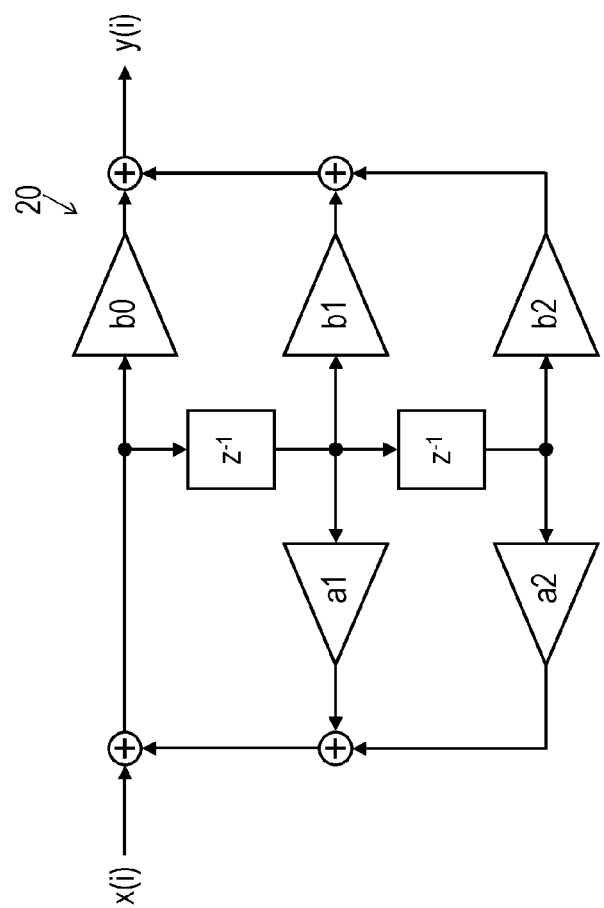
FIG. 3 is a schematic diagram of the filter of the motor control device according to the embodiment.

FIG. 3 is a block diagram of filter 20 corresponding to transfer function H(z). Filter 20 is implemented by a second-order digital IIR filter illustrated in FIG. 3.

In filter 20 illustrated in FIG. 3, unless values of filter coefficients a1, a2, b0, b1, and b2 are changed in a duration of input/output of filter 20 for each sample period, the sum of inputs into filter 20 is equal to the sum of outputs from filter 20. On the contrary, in filter 20 illustrated in FIG. 3, when the values of filter coefficients a1, a2, b0, b1, and b2 are changed in the duration, the sum of inputs into filter 20 is not equal to the sum of outputs from filter 20.

In filter 20 illustrated in FIG. 3, by changing the values of filter coefficients a1, a2, b0, b1, and b2 in duration of input/output of filter 20 for each sample period, the sum of inputs can be equal to the sum of outputs, the configuration of filter 20 illustrated in FIG. 2 can be obtained.

The configuration of filter 20 illustrated in FIG. 2 will be detailed below.

Input data x(i) is input to filter 20, and output data y(i) is output from filter 20, where i is a natural number. Input data x(i) and output data y(i) indicate values of input data and output data in the i-th period, respectively.

In the following description, intermediate variables u0(i), u1(i), u2(i), and W(i) in the i-th period are defined. Filter coefficients a1(a), a2(i), b0(i), b1(i), and b2(i) indicate the values of filter coefficients a1, a2, b0, b1, and b2 in the i-th period, respectively, and the values change every computation period.

In the following description, delay factor $z^{-n}$ (a delay block) is introduced. Delay factor $z^{-n}$ is a factor for outputting a value of input before n periods. For example, $z^{-1}$ is a factor for outputting a value of input before one period.

Output data y(i) in the i-th period is represented by Formula 3 with the intermediate variables and the filter coefficients.

$$y(i)=b0(i) \cdot u0(i)+b1(i) \cdot u1(i)+b2(i) \cdot u2(i) \quad \text{[Formula 3]}$$

Intermediate variables u0(i), u1(i), u2(i), and W(i) are calculated by Formulae 4 to 7.

$$u2(i)=u1(i-1) \quad \text{[Formula 4]}$$

$$u1(i)=u0(i-1) \quad \text{[Formula 5]}$$

$$W(i)=a1(i) \cdot u1(i)+a2(i) \cdot u2(i) \quad \text{[Formula 6]}$$

$$u0(i)=W(i)+x(i) \quad \text{[Formula 7]}$$

A configuration for setting filter coefficients a1(i), a2(i), b0(i), b1(i), and b2(i) will be described below.

Initial filter coefficients A1s, A2s, B0s, B1s, and B2s are determined based on the cutoff frequency at a start position which is an angular position at which rotation of motor 7, that is, movement is started. Target filter coefficients A1e, A2e, B0e, B1e, and B2e are determined based on the cutoff frequency at a target position which is an angular position at which rotation of motor 7, that is, movement is ended. Initial filter coefficients A1s, A2s, B0s, B1s, and B2s and target filter coefficients A1e, A2e, B0e, B1e, and B2e are thus obtained. Using these filter coefficients, constants A1(k), A2(k), B0(k), B1(k), and B2(k), which asymptotically change from the initial filter coefficients to the target filter coefficients for each computation period, are obtained by Formula 8.

$$B0(k)=(1-\alpha) \cdot B0s+\alpha \cdot B0e$$

$$B1(k)=(1-\alpha) \cdot B1s+\alpha \cdot B1e$$

$$B2(k)=(1-\alpha) \cdot B2s+\alpha \cdot B2e$$

$$A1(k)=(1-\alpha) \cdot A1s+\alpha \cdot A1e$$

$$A2(k)=(1-\alpha) \cdot A2s+\alpha \cdot A2e \quad \text{[Formula 8]}$$

Here, k is a natural number satisfying 1≤k≤N when an interpolation number from the movement start position to the target position is a natural number N. Value α is obtained by Formula 9.

$$\alpha=(k-1)/(N-1)$$

$$1 \leq k \leq N \quad \text{[Formula 9]}$$

Initial filter coefficients A1s, A2s, B0s, B1s, and B2s at a movement start position which is an angular position at which rotation of motor 7 is started, and target filter coefficients A1e, A2e, B0e, B1e, and B2e at a target position which is an angular position at which rotation of motor 7 is ended satisfy a relationship of Formula 10.

$$A1s+A2s+B0s+B1s+B2s=1$$

$$A1e+A2e+B0e+B1e+B2e=1 \quad \text{[Formula 10]}$$

Therefore, a relationship of Formula 11 is satisfied for constants A1(k), A2(k), B0(k) B1(k) and B2(k).

$$A1(k)+A2(k)+B0(k)+B1(k)+B2(k)=1 \quad \text{[Formula 11]}$$

Here, value α indicates a combination ratio when filter coefficients a1(i), a2(i), b0(i), b1(i), and b2(i) changes from initial filter coefficients A1s, A2s, B0s, B1s, and B2s to target filter coefficients A1e, A2e, B0e, B1e, and B2e. Value α changes from 0 at the start to 1 at the end during computation.

Although value α can be obtained by Formula 9, value α may be obtained using a data table, or may be obtained by using a first-order delay curve or a high-order function curve.

Using constants A1(k), A2(k), B0(k), B1(k) and B2(k), filter coefficients a1(i), a2(i), b0(i), b1(i), and b2(i) of the i-th period are calculated as follows.

Filter coefficients a1(1), a2(1), b0(1), b1(1), and b2(1) of the first period (i=1, k=1) are calculated by Formula 12.

$$a1(1)=A1(1)=A1s$$

$$a2(1)=A2(1)=A2s$$

$$b0(1)=B0(1)=B0s$$

$$b1(1)=B1(1)=B1s$$

$$b2(1)=B2(1)=B2s \qquad \text{[Formula 12]}$$

Filter coefficients a1(2), a2(2), b0(2), b1(2), and b2(2) of the second period (i=2, k=2) are calculated by Formula 13.

$$a1(2)=A1(1)=A1s$$

$$a2(2)=A2(1)=A2s$$

$$b0(2)=B0(2)$$

$$b1(2)=B1(1)=B1s$$

$$b2(2)=B2(1)=B2s \qquad \text{[Formula 13]}$$

Thereafter, filter coefficients a1(i), a2(i), b0(i), b1(i), and b2(i) up to the N-th period (3≤i≤N) are calculated by Formula 14.

$$a1(i)=A1(i-1)$$

$$a2(i)=A2(i-2)$$

$$b0(i)=B0(i)$$

$$b1(i)=B1(i-1)$$

$$b2(i)=B2(i-2) \qquad \text{[Formula 14]}$$

Filter coefficients a1(N+1), a2(N+1), b0(N+1), b1(N+1), and b2(N+1) of the N+1-th period (i=N+1) are calculated by Formula 15.

$$a1(N+1)=A1(N)=A1e$$

$$a2(N+1)=A2(N-1)$$

$$b0(N+1)=B0(N)=B0e$$

$$b1(N+1)=B1(N)=B1e$$

$$b2(N+1)=B2(N-1) \qquad \text{[Formula 15]}$$

Filter coefficients a1(i), a2(i), b0(i), b1(i), and b2(i) after the (N+2)-th period (i?N+2) are calculated by Formula 16.

$$a1(i)=A1(N)=A1e$$

$$a2(i)=A2(N)=A2e$$

$$b0(i)=B0(N)=B0e$$

$$b1(i)=B1(N)=B1e$$

$$b2(i)=B2(N)=B2e \qquad \text{[Formula 16]}$$

After data of the N-th period is input into filter 20, data remains in filter 20 even after the (N+1)-th period. For this reason, until the data remaining in filter 20 is output, filter 20 obtains output data y(i) by continuously computing filter coefficients using Formulas 3 to 7, and outputs output data y(i).

By calculating the filter coefficients as described above, even when filter coefficients a1(i), a2(i), b0(i), b1(i), and b2(i) are changed while data is input into filter 20, the sum of input data x(i) into filter 20 is equal to the sum of output data y(i) from filter 20.

FIG. 4 illustrates values of input data x(i) in the i-th period between the first period and the m-th period, filter coefficients a1(i), a2(i), b0(i), b1(i), and b2(i), intermediate variables u0(i), u1(i), and u2(i), and output data y(i) in the case where the actual number of data, that is, interpolation number N, is N=5 (1≤i≤m, i=1 to m).

The number i indicates the order of the period, and input data x(i) which is input into filter 20 is a movement command from movement command generator 1. Intermediate variables u0(i), u1(i), and u2(i) have value q(j). Output data y(i) is a movement command which is output from filter 20 and is input into position controller 2.

N (interpolation number, that is, the actual number of data) is 5, and each input data (movement command) is set to p1 to p5.

Filter coefficients a1(i), a2(i), b0(i), b1(i), and b2(i) are changed according to Formulas 12 to 16.

Intermediate variables u0(i), u1(i), and u2(i) have value q(j) (j=1 to m). FIG. 4 illustrates contents of value q(j) in a column titled as "Value of Intermediate Variable".

Output data y(i) which is a value calculated according to Formula 3 is expressed by using value q(j).

Using the values, matching of the sum of input data x(i) into filter 20 and the sum of output data y(i) from filter 20 will be described below.

Formula 17 is obtained by respectively summing each left side and each right side of the contents of value q(j) (j=1 to m) illustrated in FIG. 4 and organizing the summed result for value q(j).

$$q(1) + q(1) + q(3) + \ldots + q(m) = \qquad \text{[Formula 17]}$$
$$p1 + p2 + p3 + p4 + p5 + (A11 + A21) \cdot q(1) +$$
$$(A12 + A22) \cdot q(2) + (A13 + A23) \cdot q(3) +$$
$$(A14 + A24) \cdot q(4) + (A15 + A25) \cdot$$
$$(q(5) + q(6) + \ldots + q(m-2)) + A15 \cdot q(m-1)$$

In addition, Formula 18 is obtained by adding output data y(i) (i=1 to m) from the first period to the m-th period to each other and organizing the added result for value q(j).

$$y(1) + y(2) + y(3) + \ldots + y(m) = \qquad \text{[Formula 18]}$$
$$(B01 + B11 + B21) \cdot q(1) + (B02 + B12 + B22) \cdot q(2) +$$
$$(B03 + B13 + B23) \cdot q(3) + (B04 + B14 + B24) \cdot q(4) +$$
$$(B05 + B15 + B25) \cdot (q(5) + q(6) + \ldots + q(m-2)) +$$
$$(B05 + B15) \cdot q(m-1) + B05 \cdot q(m)$$

Formula 19 is obtained by summing left sides of Formula 17 and Formula 18, summing right sides of Formula 17 and Formula 18, and organizing the summed results for value q(j).

$$y(1) + y(2) + y(3) + \ldots + y(m) + q(1) + \qquad \text{[Formula 19]}$$
$$q(2) + q(3) + \ldots + q(m) = p1 + p2 + p3 + p4 +$$
$$p5 + (A11 + A21 + B01 + B11 + B21) \cdot q(1) +$$
$$(A12 + A22 + B02 + B12 + B22) \cdot q(2) +$$
$$(A13 + A23 + B03 + B13 + B23) \cdot q(3) +$$
$$(A14 + A24 + B04 + B14 + B24) \cdot q(4) +$$

-continued $$(A15 + A24 + B05 + B15 + B25) \cdot$$
$$(q(5) + q(6) + \ldots + q(m-2)) +$$
$$(A15 + A05 + B05) \cdot q(m-1) + B05 \cdot q(m)$$

Using Formula 11, Formula 19 is expressed by Formula 20.

$$y(1) + y(2) + y(3) + \ldots + y(m) + q(1) + q(2) +$$
$$q(3) + \ldots + q(m) = p1 + p2 + p3 + p4 + p5 +$$
$$q(1) + q(2) + q(3) + q(4) + q(5) + q(6) + \ldots +$$
$$q(m-2) + (A15 + B05 + B15) \cdot q(m-1) + B05 \cdot q(m)$$

[Formula 20]

Formula 21 is obtained by subtracting $(q(1)+q(2)+ \ldots q(m-2))$ from both sides of Formula 20.

$$y(1) + y(2) + y(3) + \ldots + y(m) + q(m-1) + q(m) = p1 + p2 +$$
$$p3 + p4 + p5 + (A15 + B05 + B15) \cdot q(m-1) + B05 \cdot q(m)$$

[Formula 21]

Formula 22 is obtained by transforming Formula 21.

$$y(1)+y(2)+y(3)+ \ldots +y(m)+r=p1+p2+p3+p4+p5$$
$$r=\{1-(A15+B05+B15)\}\cdot q(m-1)+(1-B05)\cdot q(m)$$

[Formula 22]

In filter 20 represented by Formula 1, value q(m) converges to 0 based on the relationship of Formula 23 when number m increases as the periods elapse.

$$a1+a2<1$$ [Formula 23]

Thus, the value in Formula 22 converges to 0 when the number m increases as the periods elapse. Therefore, as expressed in Formula 24, the sum of output data y(i) from the first period to the m-th period converges to the sum of input data (i).

$$\lim_{m\to\infty} \{y(1) + y(2) + y(3) + \ldots + y(m)\} =$$
$$p1 + p2 + p3 + p4 + p5$$

[Formula 24]

That is, when number m is sufficiently increased by an elapse of a sufficient number of periods, the sum of output data y(i) of filter 20 can be regarded as being equal to the sum of input data x(i) of filter 20.

Alternatively, in the case where value q(m) becomes sufficiently small, when the value r of Formula 22 is added to output data y(m) of the last m-th period and the added result is output, the sum of output data y(i) of filter 20 is equal to the sum of input data x(i) into filter 20 after a small number of periods elapse.

Alternatively, filter 20 may output the value r of Formula 22 as output data y(m+1) of the (m+1)-th following output data y(m) of the m-th period.

Although Formula 22 is a result of a case where the interpolation number N is N=5 (p1 to p5), even when generalizing Formula 22 by setting the interpolation number N to n (N=n), the same result is obtained. That is, the sum of output data y(i) from the first period to the m-th period is expressed by Expression 25.

$$y(1)+y(2)+y(3)+ \ldots +y(m)+r=p1+p2+p3+p4+ \ldots$$
$$+pn$$
$$r=\{1-(A1n+B0n+B1n)\}\cdot q(m-1)+(1-B0n)\cdot q(m)$$
$$m\geq n+2$$

[Formula 25]

As described above, motor control device 1001 includes movement command generator 1 that outputs a movement command of the motor 7, filter 20 that performs filter processing of the movement command and outputs the filtered movement command, and position controller 2 that performs a position control of the motor 7. Filter 20 is an infinite impulse response digital filter that is represented by a transfer function H(z) with filter coefficients a1, a2, b0, b1, and b2: $H(z)=(b0+b1\cdot z^{-1}+b2\cdot z^{-2})/\{1-(a1\cdot z^{-1}+a2\cdot z^{-2})\}$. Filter 20 outputs output data based on input data input in plural sample periods. Position controller 2 is configured to perform the position control of motor 7 based on the output data. Filter 20 is configured to change the filter coefficient b0 in a certain sample period among the plural sample periods, change filter coefficients a1 and b1 in a further sample period among the plural sample periods which follows the certain sample period, and change filter coefficients a2 and b2 in a still further sample period among the plural sample periods which follows the further sample period.

Filter 20 is configured not to change filter coefficients a1, a2, b1, and b2 in the certain sample period, not to change filter coefficients a2, b0, and b2 in the further sample period, and not to change filter coefficients a1, b0, and b1 in the still further sample period.

The configuration can change the filter coefficients in the duration of input/output of filter 20 at each sample period while the sum of the input data is equal to the sum of the output data without increasing a computation load of the CPU constituting at least one filter 20 (IIR filter).

Motor control device 1001 according to the embodiment suppresses an overshoot caused by a movement command over a wide posture range for an industrial machine, such as a robot, which is driven by motor 7 and in which the natural vibration frequency changes to a low frequency according to the posture of the robot.

REFERENCE MARKS IN DRAWINGS

1 movement command generator
2 position controller
3 speed controller
4 current controller
5 amplifier
6 current detector
7 motor
8 position detector
9 power supply
10 processor
20 filter

The invention claimed is:

1. A motor control device for controlling a motor, comprising:
   a movement command generator that outputs a movement command of the motor;
   a filter that performs filter processing of the movement command and outputs the filtered movement command; and
   a position controller that performs a position control of the motor,
   wherein the filter is an infinite impulse response digital filter that is represented by a transfer function H(z):

$H(z)=(b0+b1\cdot z-1+b2\cdot z-2)/\{1-(a1\cdot z-1+a2\cdot z-2)\}$ with filter coefficients a1, a2, b0, b1, and b2, and that outputs output data based on input data input in a plurality of sample periods that includes at least a first sample period, a second sample period that follows the first sample period, and a third sample period that follows the second sample period, wherein the position controller is configured to perform the position control of the motor based on the output data, and wherein the filter is configured to:
- change the filter coefficient b0 in the first sample,
- change the filter coefficients a1 and b1 in the second sample period,
- change the filter coefficients a2 and b2 in the third sample period,
- not change the filter coefficients a1, a2, b1, and b2 in the first sample period,
- not change the filter coefficients a2, b0, and b2 in the second sample period, and
- not change the filter coefficients a1, b0, and b1 in the third sample period.

\* \* \* \* \*